(12) United States Patent
Yazawa et al.

(10) Patent No.: US 8,404,616 B2
(45) Date of Patent: Mar. 26, 2013

(54) PHOTOCATALYST AND METHOD FOR PRODUCING SAME

(75) Inventors: Tetsuo Yazawa, Osaka (JP); Kaori Oki, Akashi (JP); Akira Agata, Tokyo (JP)

(73) Assignee: Patent Technology Development Inc., Tokyo (JP)

( * ) Notice: Subject to any disclaimer, the term of this patent is extended or adjusted under 35 U.S.C. 154(b) by 1190 days.

(21) Appl. No.: 10/593,249

(22) PCT Filed: Mar. 11, 2005

(86) PCT No.: PCT/JP2005/004369
§ 371 (c)(1),
(2), (4) Date: Sep. 15, 2006

(87) PCT Pub. No.: WO2005/089941
PCT Pub. Date: Sep. 29, 2005

(65) Prior Publication Data
US 2007/0042902 A1 Feb. 22, 2007

(30) Foreign Application Priority Data

Mar. 18, 2004 (JP) ................................. 2004-079120

(51) Int. Cl.
*B01J 21/06* (2006.01)
*B01D 53/56* (2006.01)
*C01B 33/113* (2006.01)

(52) U.S. Cl. ......... 502/232; 423/235; 423/324; 423/325

(58) Field of Classification Search .................... 502/22, 502/27, 232, 407, 408, 409; 423/235, 324, 423/325
See application file for complete search history.

(56) References Cited

U.S. PATENT DOCUMENTS

| 6,277,349 | B1 | 8/2001 | Westbrook et al. |
| 2002/0170815 | A1* | 11/2002 | Fujii .......................... 204/157.3 |
| 2004/0018361 | A1* | 1/2004 | Takahashi et al. ............ 428/428 |

FOREIGN PATENT DOCUMENTS

| EP | 0 219 840 | 4/1987 |
| JP | 10-310401 | 11/1998 |
| JP | 2001-157843 | 6/2001 |
| JP | 2001-239164 | 9/2001 |

(Continued)

OTHER PUBLICATIONS

Mikawa et al., "Helical Etch Channels in Synthetic Quartz Crystals." 1998 IEEE Int'l Frequency Control Symposium, pp. 801-805 (1998, no month).*

(Continued)

*Primary Examiner* — Daniel C McCracken
*Assistant Examiner* — Daniel Berns
(74) *Attorney, Agent, or Firm* — Wenderoth, Lind & Ponack, L.L.P.

(57) ABSTRACT

A photocatalyst produced from an easily available, relatively low-cost silicon oxide material is disclosed which is capable of decomposing environmental pollutants with improved efficiency. The photocatalyst is produced by pulverizing an artificial crystal, specifically machining waste thereof, into powder particles having a particle diameter of not more than 3.0 mm and then immersing the particles into a solution containing a hydrogen fluoride for activation. Environmental pollutants such as nitrogen oxides (NOx) and harmful organic compounds can be efficiently decomposed by coming into contact with this photocatalyst while being irradiated with activation light under oxidizing conditions.

6 Claims, 4 Drawing Sheets

FOREIGN PATENT DOCUMENTS

| | | | |
|---|---|---|---|
| JP | 2001-276194 | | 10/2001 |
| JP | 2003-265966 | | 9/2003 |
| JP | 2003-340289 | | 12/2003 |
| JP | 2004-290747 | * | 10/2004 |
| JP | 2004-290748 | * | 10/2004 |

OTHER PUBLICATIONS

Wilson, P., "Experimental investigation of etch put formation on Quartz sand grains." Geological Magazine 116 (6), pp. 477-482 (1979, no month).*

Schoderbock et al., "The influence of impurities contained in quartz sand on the catalytic reduction of nitric oxide by carbon monoxide." Applied Surface Science 93 (1996) 109-118.*

Feng, Jiyun et al., "*Novel Bentonite Clay-Based Fe-Nanocomposite as a Heterogeneous Catalyst for Photo-Fenton Discoloration and Mineralization of Orange II*", Environ.Sci.Technol., Jan. 2004, vol. 38, No. 1, pp. 269-275.

Yuichi Ichihashi et al., "*Formation of Ethylene Oxide by Photooxidation of Ethylene over Silica Modified with Copper*", Studies in Surface Science and Catalysts (2000), vol. 130, pp. 1995-1960.

Hisao Yoshida et al., "*Epoxidation of Propene by Gaseous Oxygen over Silica and Mg-Loaded Silica under Photoirradiation*", Journal of Catalysts (1997), vol. 171, pp. 351-357.

Supplementary European Search Report issued Sep. 7, 2010 in corresponding European Patent Application No. 05720640.

L.A. Komarova et al., "*Using Ammonium Difluoride for the Beneficiation of Quartz Raw Materials*", Steklo I Keramika (English Translation), vol. 6, Jun. 30, 1987, pp. 240-242, XP002595822.

Z. Elias et al., "*Cytotoxic and Transforming Effects of Silica Particles With Different Surface Properties in Syrian Hamster Embryo (SHE) Cells*", Toxicology in Vitro, vol. 14, Mar. 6, 2000, pp. 409-422, XP002595823.

F. Iwasaki, "*Hydrogen Bonded OH in Synthetic Quartz*", Japanese Journal of Applied Physics, vol. 19, No. 7, Jul. 31, 1980, pp. 1247-1256, XP002595824.

* cited by examiner

PHOTOCATALYST AND METHOD FOR PRODUCING SAME

TECHNICAL FIELD

The present invention relates to a novel photocatalyst capable of eliminating environmental pollutants at a high efficiency, a method for producing the same from a base material that is easily obtained, and a cleaning method for eliminating environmental pollutants by photodecomposition thereof with the photocatalyst.

BACKGROUND TECHNOLOGY

Photocatalysts play an important role as a so-called environmental catalyst which eliminate nitrogen oxides (NOx) and harmful organic compounds in the atmospheric air, such as formaldehyde, chlorinated hydrocarbons, dioxins and the like, or harmful organic materials present in daily life water, various types of household effluents and industrial effluents to clean the environment.

Titanium dioxide is widely used as this photocatalyst in respect of the most stable one with almost no toxicity against living organisms. When this titanium dioxide is exposed to near UV radiation around 400 nm, an electron in the filled band is excited to the conduction band to cause charge separation. The resultant charge site serves as a source to generate a hydroxyl radical or a superoxide anion which decomposes environmental pollutants, such as organic halides and nitrogen oxides, by its strong oxidizing action.

However, titanium dioxide is photocatalytically active only in a wavelength range around 400 nm, and not photocatalytically active in other wavelength ranges, and therefore naturally subject to a limited range of applications.

For that purpose, photocatalysts have been proposed, such as a composite of titanium dioxide and an inorganic porous material, e.g., activated carbon, high-silica zeolite, silica gel, sepiolite, bentonite, magnesium sulfate and others (JP2001-276194A); a visible light-sensitive photocatalyst comprising a titanium dioxide film having a very thin layer of N-doped $TiO_2$ formed on the surface layer (JP2003-265966A); a photocatalytic composition comprising a visible light-sensitive photocatalyst and a photocatalyst having a specific surface area larger than the said visible light-sensitive photocatalyst (JP2003-340289A) and the like.

Furthermore, alternative photocatalysts free of titanium dioxide have been proposed, such as a composite photocatalyst for hydrogen generation comprising cadmium sulfide and a sulfide of a different metal (JP2001-239164A); a semiconductor photocatalyst having semiconductor particles encapsulated with a polymer (JP10-310401A); a photocatalyst comprising layered composite metal oxide including interlayer cadmium sulfide (JP2001-157843A) and the like. However, none of the photocatalysts can provide so high a conversion rate as to be feasible.

On the other hand, methods using a silicon oxide as a photocatalyst have been known such as, for example, a method for photooxidation of ethylene with silica (Studies in Surface Science and Catalysts, vol. 130, 2000, p. 1955-1960), a method for epoxidation of propylene with gaseous oxygen in the presence of silica or manganese-loaded silica (J. Catalysts, vol. 171, 1997, p. 351-357) and others. However, these methods not only have to require an ultrahigh-pressure mercury lamp as a light source but provide a low conversion rate of at most 30%, so that they are far from feasible.

Under such circumstances, the inventors have already proposed a photocatalyst comprising fused quartz treated with a hydrohalogeno acid (JP2003-83950) and a method of eliminating nitrogen oxides by photooxidation with the same photocatalyst (JP2003-83951). The photocatalyst has advantages of being effective for radiation in a wider range of wavelengths compared with conventional silicon oxide-based photocatalysts and producing nitric acid at a much higher rate than titanium dioxide-based photocatalysts, but disadvantageously it is difficult to obtain due to the unusual base material that is fused quartz, and does not decompose at a high rate harmful substances except nitrogen oxides, such as toluene, acetaldehyde, ethanedithiol and others. Accordingly, the photocatalyst is not always satisfactory yet for practical use.

DISCLOSURE OF THE INVENTION

The object of the present invention is to provide a photocatalyst comprising a silicon oxide material as a base material which is more easily obtained at a lower cost than the fused quartz conventionally used and capable of decomposing and eliminating environmental pollutants at a higher efficiency.

As a result of extensive study to develop a photocatalyst comprising a base material that is low-cost and easily obtained, the inventors have arrived at a discovery that a catalyst having quite unexpectedly high photodecomposition power can be obtained by using machining waste of artificial quartz crystals widely used as a material of decorative and artistic articles which are pulverized followed by hydrogen fluoride treatment leading to completion of the present invention based on the discovery.

Namely, the present invention provides a photocatalyst comprising artificial crystalline quartz particles treated with hydrogen fluoride, a method for preparation of the photocatalyst, characterized by pulverizing artificial quartz crystals into particles having a particle diameter of 3.0 mm or smaller and then activating the particles by immersing the same in a solution containing hydrogen fluoride, and a cleaning method characterized by bringing a gas or liquid containing environmental pollutants into contact with the above-mentioned photocatalyst under oxidative conditions during irradiation of activation light to render the environmental pollutants harmless.

In the next place, the present invention will be described in detail.

An artificial quartz crystal itself used in the present invention is known and easily obtained as a commercial product. In the present invention, the artificial quartz crystal can be employed by freely selecting from colorless, transparent ones without impurities.

The artificial quartz crystal can be produced by the hydrothermal growth method, for example, using a large-scale autoclave with a volume of 1,000 liters or larger. The hydrothermal growth method capable of producing an artificial quartz crystal at a temperature of 573° C. or lower is preferred because crystalline quartz is transformed into quartz glass when fused at a higher temperature and, it has the α to β transition point at 573° C., and further is transformed irreversibly into β-tridymite at 870° C. or higher.

According to this method, the artificial quartz crystal can be obtained by dissolving starting crystalline quartz in a solvent (an alkaline solution) in an autoclave and keeping it under the conditions of 350-370° C. and 78.4-147 MPa to deposit and grow artificial quartz crystals on the seed crystals set at a side of temperature 20 to 35° C. lower than that.

The thus obtained artificial quartz crystal consists of colorless, transparent crystals of which the composition is formed of $SiO_2$ almost free of other components.

The present invention requires such an artificial quartz crystal for the photocatalyst which cannot be produced from naturally occurring quartz crystal.

In the present invention, the artificial quartz crystal is pulverized into particles having a particle diameter of 3.0 mm or smaller or, preferably, 2.0 mm or smaller or, more preferably, 1.0 mm or smaller, which are used thereafter. As the particle diameter is smaller, the resultant catalyst is more active, but too fine a particle diameter will make it difficult to handle the photocatalyst when it is used, for example, to filtrate/separate the catalyst. Therefore, the particle diameter should be selected appropriately depending on the intended application. For instance, the particles may be prepared to have a diameter of 10 μm or smaller if they are mixed in a coating.

Such artificial crystalline quartz particles must be then subjected to a hydrogen fluoride treatment to activate them. The hydrogen fluoride treatment is conducted by immersing the particles in a solution of hydrogen fluoride. The solution of hydrogen fluoride to be used is an alcoholic solution or aqueous solution containing hydrogen fluoride in a concentration of 1-30% by mass or, preferably, 5-20% by mass.

When the concentration of the hydrogen fluoride solution is too low or too high, the resultant catalyst is likely to be less activated. Although the optimum concentration of the hydrogen fluoride solution depends on the particle diameter, a hydrogen fluoride solution for a particle diameter of 1 mm should have an optimum concentration of about 10% by mass and a hydrogen fluoride solution for a particle diameter of 3 mm should have an optimum concentration of about 15% by mass.

The length of time necessary for the hydrogen fluoride treatment is typically 1-60 minutes at room temperature and occasionally longer, depending on the particle diameter of the artificial crystalline quartz particles used as a base material and the concentration of the hydrogen fluoride solution. Usually, when particles have a large particle diameter or the hydrogen fluoride solution having a low concentration is used, it necessarily takes a long time, while it possibly takes a short time to perform the treatment when particles have a small particle diameter or the hydrogen fluoride solution having a low concentration is used. For instance, it takes about 1-15 minutes to sufficiently treat artificial crystalline quartz particles of 1 mm in diameter with a hydrogen fluoride solution in a concentration of 10% by mass, but it takes about 25 minutes or longer to promote the reaction to the limit. It also takes about 1-15 minutes to sufficiently treat artificial crystalline quartz particles of 3 mm in diameter with a hydrogen fluoride solution in a concentration of 15% by mass, but it takes about 60 minutes or longer to promote the reaction to the limit.

The hydrogen fluoride solution may be used in an amount of 3-20 times or, preferably, 5-10 times by volume ratio of the artificial crystalline quartz particles.

Such activation of the artificial quartz crystal by the hydrogen fluoride treatment is explained by such a mechanism that contact of $SiO_2$ with HF will cause bonding of Si on the surface with F, whereby the bonding electrons will be attracted toward the F to weaken the back bond which will be attacked by the dissociated $H^+F^-$ molecule followed by breaking of the back bond to fluorinate the utmost Si surface and at the same time hydrogenate one of the bonds on the second lower layer. Such a state will propagate one after another to finally release the utmost Si surface as a form of $SiF_4$ and remain an $SiH_3$ radical on the surface.

However, the $SiH_3$ radical forms a very weak Si—Si bond with Si present on the next lower layer and has bonding electrons attracted toward the H atoms. As a consequence, the $SiH_3$ radical will be easily cut off by facile substitution thereof with the H of an HF molecule to leave an SiH which provides an exposed H on the Si (111) surface to activate the surface.

In this way, the artificial quartz crystal treated with hydrogen fluoride is separated from the solution followed by washing 2-5 times with distilled water and air drying to give the photocatalyst.

The artificial quartz crystal is activated by hydrogen fluoride as described above, but naturally occurring crystalline quartz is not activated by hydrogen fluoride even if it is formed of the same crystalline silica as the artificial counterpart. It has not yet been made clear why such a difference can occur.

Figure 1:
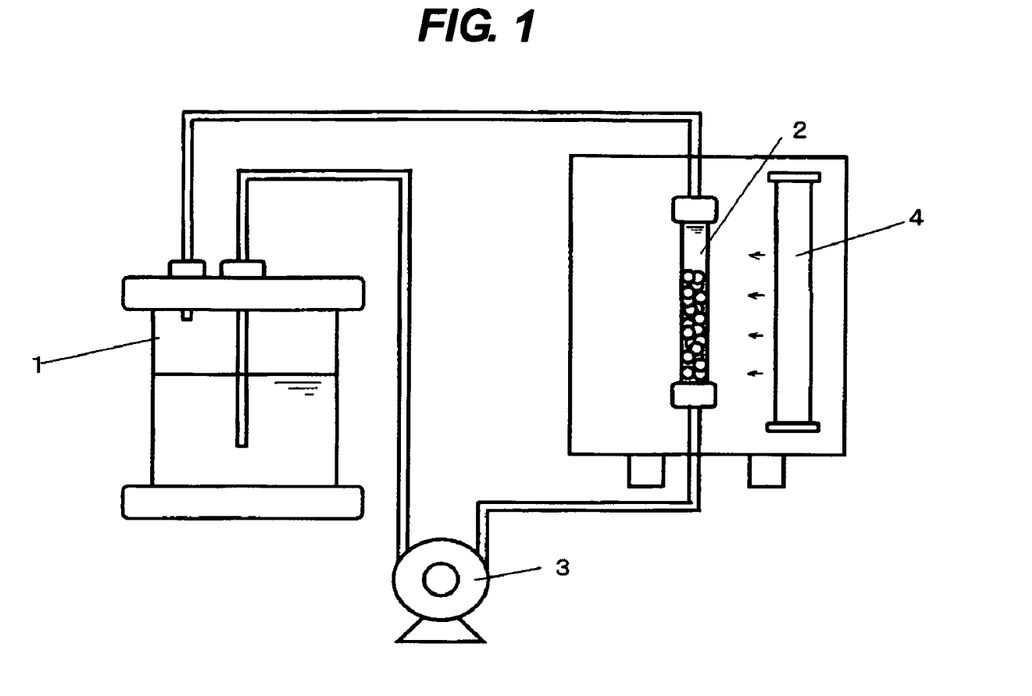
FIG. 1 shows an apparatus for assessment of the activity of the photocatalyst by carrying out the reaction for photodecomposition to cause decoloration of methylene blue with the photocatalysts prepared in Examples 1 to 4 and in Comparative Example.

The activity of the inventive photocatalyst can be determined, for example, by using an apparatus shown in FIG. 1, where an aqueous methylene blue solution is introduced into a reservoir vessel 1 followed by circulation of the solution by a circulating pump 3, and passing through a column 2 filled with the photocatalyst under exposure to a radiation from a low-pressure mercury lamp 4 to induce photodecomposition reaction of the methylene blue, and measuring the thus obtained solution for color density over time with a calorimeter, wherein the activity is expressed by the following equation:

$$\text{Decomposition rate of dye } (\%/g) = \frac{(X-Y)/X}{\text{Mass of catalyst}} \times 100$$

In the above equation, X represents the initial color density of the aqueous methylene blue solution, and Y represents the color density after photoreaction of the aqueous methylene blue solution. Since the decomposition rate of the dye is exactly correlated to the decomposition rate of other substances such as, for example, environmental pollutants, it is possible to know the difference in the relative activity by making comparison with the decomposition rate obtained under identical conditions with other photocatalysts such as, for example, titanium dioxide photocatalysts.

It has been verified in this way that the inventive photocatalyst is at least 2.7 times more active than the titanium dioxide photocatalyst supported on a porous glass carrier which is known as the most active photocatalyst in the prior art.

When particles having a small particle diameter of, for example, 100 μm or smaller are used, it is preferable to granulate the hydrogen fluoride-treated particles with a conventional binder, such as polyvinyl alcohol or carboxymethylcellulose, or to use a coating film provided with a binder on a suitable substrate. In addition, the fine particulate catalyst can be employed by being carried on a porous support formed of an inorganic or organic material.

The photocatalyst according to the present invention can contribute to the decomposition of environmental pollutants for oxidation under irradiation of radiation under oxidative conditions. The environmental pollutants include, for example, nitrogen oxides NOx causing air pollution, such as nitrous oxide $N_2O$, nitrogen monoxide NO, dinitrogen trioxide $N_2O_3$ and nitrogen dioxide $NO_2$; organic halides causing environmental pollution, such as trichloroethane, tetrachloroethylene, dichlorodifluoromethane, tribromomethane, polychlorobiphenyls and the like; aldehyde compounds and aromatic hydrocarbons causing sick house syndrome, such as formaldehyde, acetaldehyde, benzene, toluene and xylene; and sulfur-containing compounds causing malodorous substance, such as mercaptans and ethanedithiol.

Environmental pollutants can be decomposed or detoxified with the inventive photocatalyst in such a way that oxygen or nitrogen is added to the environmental pollutants followed by bringing the mixture into contact, under irradiation of activating light, with the inventive photocatalyst.

Conventional semiconductor photocatalysts, such as $TiO_2$ and ZnO, are active to decompose environmental pollutants only in such a light wavelength range as they absorb, but does not exhibit the catalytic activity in other wavelength lights, and therefore naturally subject to a decreased availability of light by using a continuous light such as sunlight. In contrast, since the inventive photocatalyst can decompose environmental pollutants with light in such a wavelength range as they scarcely absorb, a radiation with a wide wavelength range such as, for example, UV or visible light can be used.

Namely, it is regarded that UV and visible light have a wavelength range of 200-400 nm and a wavelength range of 400-800 nm, respectively, and a radiation having a wavelength range as wide as 200-800 nm can be employed for the inventive photocatalyst. Generally, it is preferable to use a radiation with a wavelength range of 240 to 500 nm for the inventive photocatalyst to decompose environmental pollutants with a high efficiency.

The light sources to generate such a radiation artificially include, for example, UV lamps, xenon lamps, fluorescent lamps, incandescent lamps and others which are conventionally used as a light source.

When the inventive photocatalyst is used to photolyze the environmental pollutants continuously, the environmental pollutants are carried together with oxygen by a fluid such as a gas or a liquid to bring them into contact with the photocatalyst. The fluid used here is not limited in particular unless it interferes with photodecomposition of the environmental pollutants. Nitrogen gas as a gas and water as a liquid are preferable since they are available in a large quantity and do not cause contamination.

In the case of photodecomposition of the environmental pollutants, oxygen concentration in the fluid used to mix therewith is not particularly limited, but the concentration thereof is preferably higher since the environmental pollutants can be decomposed at a higher efficiency. If the fluid is a gas, it is preferable to use air due to the cost so that the fluid has an oxygen concentration of about 20% by volume, and if the fluid is a liquid, water is used for the same reason so that the fluid has an oxygen concentration of 4.9% by volume (in the standard state).

When the environmental pollutants are organic compounds, on the other hand, oxygen is preferably supplied so as to provide at least two oxygen molecules per carbon atom contained in a molecule of the organic compound, though not particularly limitative.

As a method for bringing a mixture of environmental pollutants and oxygen into contact with a photocatalyst according to the inventive method, either of a batch process, where both of them are put in a hermetic container and the fluid is brought into contact with the surface of the photocatalyst through the thermal motion of the fluid, and a flow process, where the fluid is forcibly moved to bring the fluid into contact with the surface of the photocatalyst, can be employed.

When the environmental pollutants are nitrogen oxides, nitrogen oxides are subject to conversion into nitric acid by conducting the above-mentioned photooxidation method in the presence of water and oxygen resulting in detoxification thereof. The amount of oxygen used here is not limited in particular, but can be selected in a range of at least 1 mol or, preferably, at least 2 mols per mol of the nitrogen oxides.

The cleaning work of environmental pollutants using the inventive photocatalyst can be usually conducted at a temperature within a range of −30° C. to 550° C. Although the photoreaction proceeds even under the atmospheric pressure, the reaction can be accelerated by pressurization according to need when environmental pollutants are contained in gas.

BEST MODE FOR CARRYING OUT THE INVENTION

The best mode for carrying out the invention will be described by way of the following Examples.

EXAMPLE 1

(1) Preparation of Photocatalysts

An artificial quartz crystal was crushed in a ball mill followed by screening to obtain a fraction (a) having a diameter of 1-2 mm and a fraction (b) having a diameter of 2-3 mm.

Then, 50 ml of the fraction (a) or the fraction (b) mentioned above were immersed in 300 ml of an aqueous solution of hydrogen fluoride in a concentration of 10% by mass, stirred for 5 minutes, washed with water and dried to prepare a photocatalyst (A) or (B). For use as a control, a photocatalyst (C) was prepared from the fraction of 1-2 mm diameter without undertaking the hydrogen fluoride treatment.

(2) Photolytic Reaction

Photocatalysts (A), (B) and (C) prepared in (1) were used to carry out the reaction for photodecomposition and decoloration of methylene blue, and comparison was made for the catalytic activity thereof.

Namely, in an apparatus having a configuration shown in FIG. 1, 1000 ml of an aqueous solution of methylene blue having a concentration of 8 ppm were put into a sample vessel 1 (with an effective volume of 1500 ml) and a column 2 (with an effective volume of 100 ml) was charged with 50 ml of the photocatalyst (A), (B) or (C). The aqueous methylene blue solution was circulated at a rate of 89 ml/minute by a circulating pump 3, under irradiation with a radiation from a low-pressure mercury lamp 4 to determine the decomposition rate (%) by measuring the absorbance with a spectrophotometer (Model "HITACHI U-1100", manufactured by Hitachi, Ltd.). The results are shown as a graph in FIG. 2.

Figure 2:
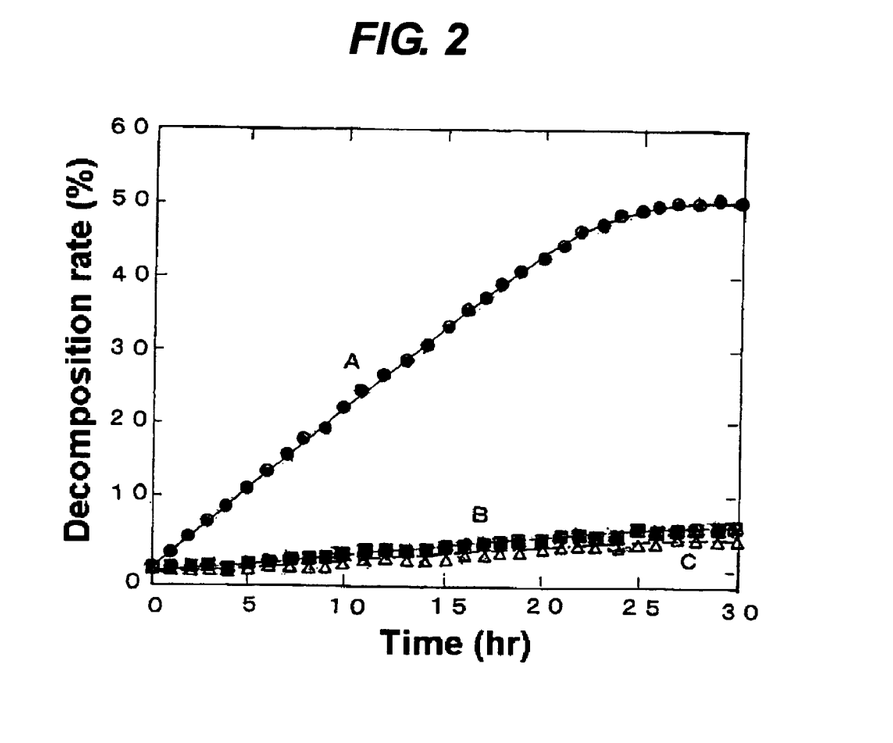
FIG. 2 is a graph showing decomposition rates of methylene blue changing over time by the photocatalysts (A), (B) and (C) prepared in Example 1.

It is understood from the results that the photocatalyst (A) prepared by the hydrogen fluoride treatment of the artificial quartz crystal with a smaller particle diameter exhibits a very high photocatalytic activity, though the photocatalyst (C) before the hydrogen fluoride treatment and the photocatalyst (B) prepared by the hydrogen fluoride treatment of the artificial quartz crystal with a larger particle diameter have a low photocatalytic activity.

EXAMPLE 2

An artificial quartz crystal was pulverized in a ball mill, and a fraction of a diameter of 2-3 mm was recovered from the resultant particles.

Then, the fraction of the artificial quartz crystal was divided into three portions, which were then immersed in an aqueous solution of 10% by mass of hydrogen fluoride for 5, 10 and 20 minutes, respectively, to prepare photocatalysts (D), (E) and (F).

These photocatalysts were used for assessment of the decomposition rates of methylene blue in the same manner as in (2) of Example 1. The results are shown in a graph giving those changing over time in FIG. 3.

Figure 3:
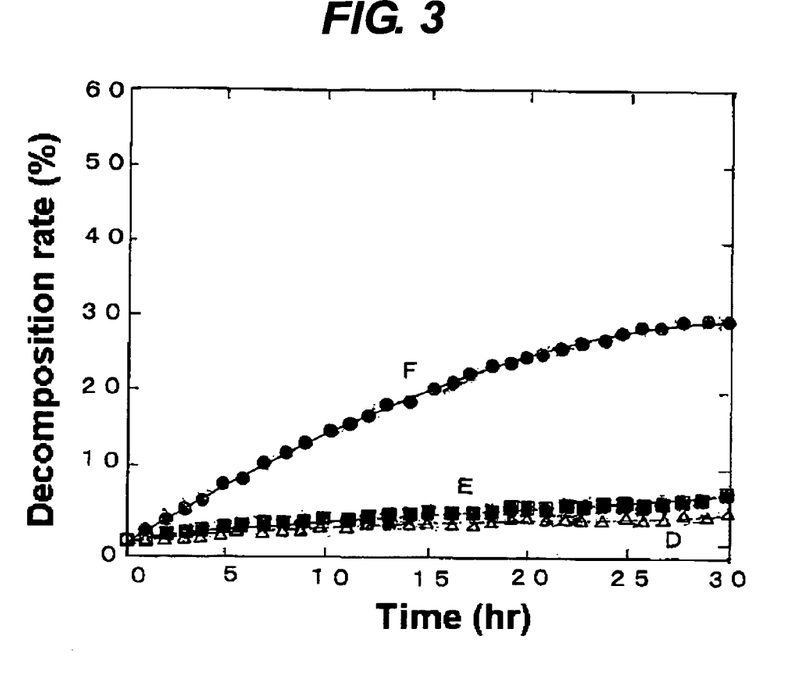
FIG. 3 is a graph showing decomposition rates of methylene blue changing over time by the photocatalysts (D), (E) and (F) prepared in Example 2.

The results demonstrate that when an aqueous solution of hydrogen fluoride in the same concentration is used to treat different samples of artificial quartz crystals with the same particle diameter, a sample treated for a longer time exhibits a higher photocatalytic activity.

EXAMPLE 3

An artificial quartz crystal was pulverized in a ball mill, and a fraction having a diameter of 2-3 mm was recovered from the resultant particles.

Then, the fraction of artificial quartz crystal was divided into three portions, which were then placed in three different kinds of aqueous solutions each having concentrations of 10% by mass, 15% by mass and 20% by mass, and treated therein for 5 minutes. In this way, photocatalysts (G), (H) and (I) were prepared.

These photocatalysts were used for assessment of the decomposition rates of methylene blue in the same manner as in (2) of Example 1. The results are shown in a graph giving those changing over time in FIG. 4.

Figure 4:
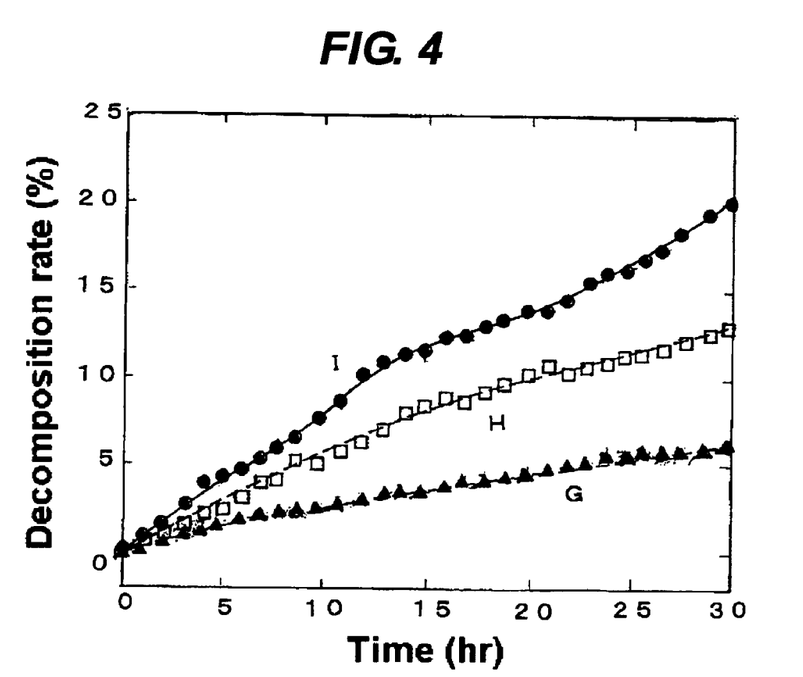
FIG. 4 is a graph showing decomposition rates of methylene blue changing over time by the photocatalysts (G), (H) and (I) prepared in Example 3.

The results demonstrate that when aqueous solutions of hydrogen fluoride in different concentrations are used to treat different respective samples of artificial quartz crystals with the same particle diameter for the same period of time, a solution having a higher concentration exhibits a higher photocatalytic activity.

EXAMPLE 4

An artificial quartz crystal was pulverized in a ball mill, and a fraction having a diameter of 0.5 mm or smaller was recovered by screening the resultant particles. The fraction was then placed in an aqueous solution of hydrogen fluoride in a concentration of 10% by mass and shaken therein for 5 minutes.

Then, the thus treated artificial quartz crystal was filtered, washed three times with deionized water and dried at 60° C. to obtain a photocatalyst (J).

Separately, a titanium dioxide catalyst (K) commercially available, a photocatalyst (L) having 1.0% by mass of $TiO_2$ chemically vapor-deposited on porous glass, and the porous glass (M) per se were provided.

These photocatalysts were determined for photocatalytic activity in the same manner as in (2) of Example 1, except that the aqueous solution of methylene blue in a concentration of 8 ppm was replaced by an aqueous solution of methylene blue in a concentration of 20 ppm.

Figure 5:
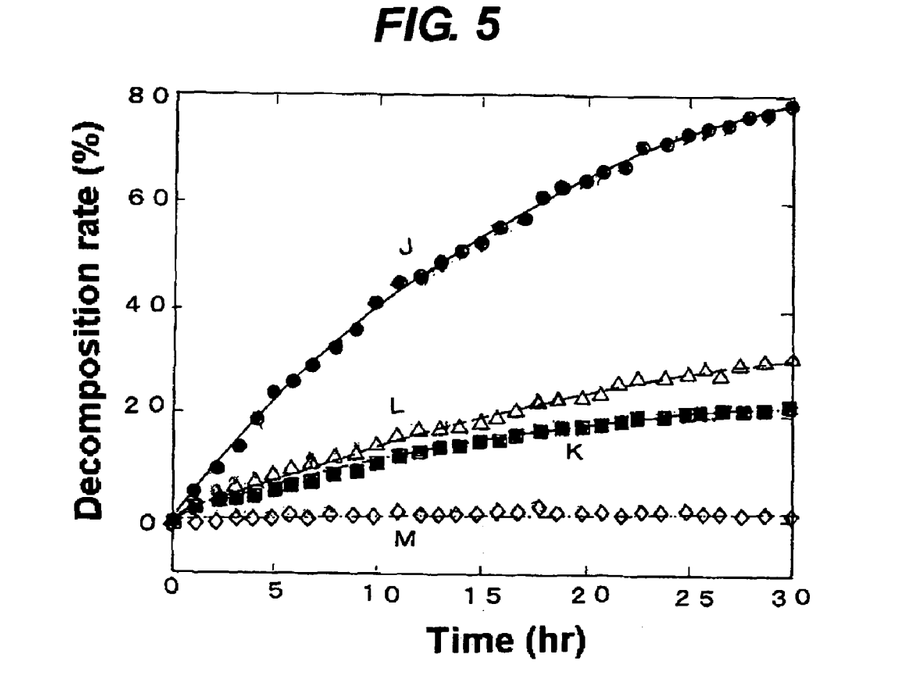
FIG. 5 is a graph showing decomposition rates of methylene blue changing over time by the photocatalysts (J), (K), (L) and (M) prepared in Example 4.

The results obtained in this way are shown in a graph giving the decomposition rates changing over time in FIG. 5. The graph demonstrates that the photocatalytic activity of the photocatalyst (J) treated with hydrogen fluoride is at least 4 times compared with that of the standard titanium dioxide photocatalyst (K), and 2.7 times even as compared with that of the porous glass-supported titanium dioxide photocatalyst (L) with a higher activity.

COMPARATIVE EXAMPLE

Natural quartz crystals from Mexico were pulverized in a ball mill, and the resultant particles were screened to obtain a fraction of 1-2 mm in diameter and a fraction of 2-3 mm in diameter. Each fraction was placed in an aqueous solution of hydrogen fluoride in a concentration of 10% by mass and shaken therein for 5 minutes. Then, it was removed therefrom, washed three times with deionized water and dried at 60° C. to prepare photocatalysts (N) and (O).

These photocatalysts (N) and (O) as well as a photocatalyst (P) as control, consisting of an untreated 1-2 mm fraction were used to experimentally decompose an aqueous methylene blue solution in a concentration of 8 ppm in the same manner as in (2) of Example 1. The results are shown in a graph giving the rates of dye decomposition changing over time in FIG. 6.

Figure 6:
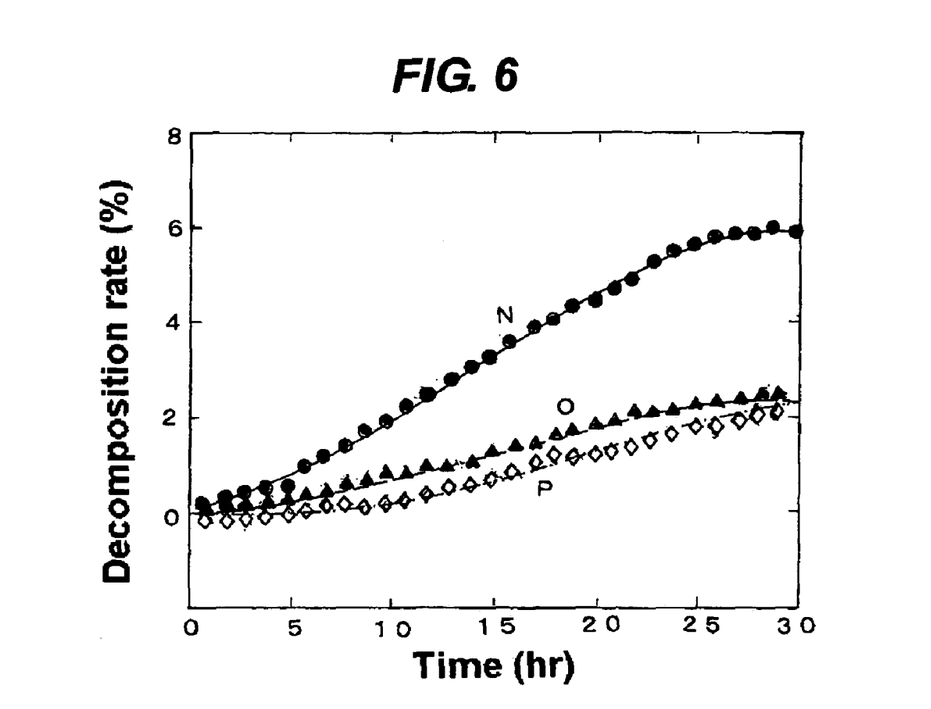
FIG. 6 is a graph showing decomposition rates of methylene blue changing over time by the photocatalysts (N), (O) and (P) prepared in Comparative Example.

The graph demonstrates that the natural quartz crystal with a smaller particle diameter of 1-2 mm exhibits an increment only in the order of a few percent in the photolytic activity of environmental pollutants by the treatment with hydrogen fluoride, and the activity of the coarser particles of 2-3 mm diameter is identical with that of the untreated particles.

EXAMPLE 5

Figure 7:
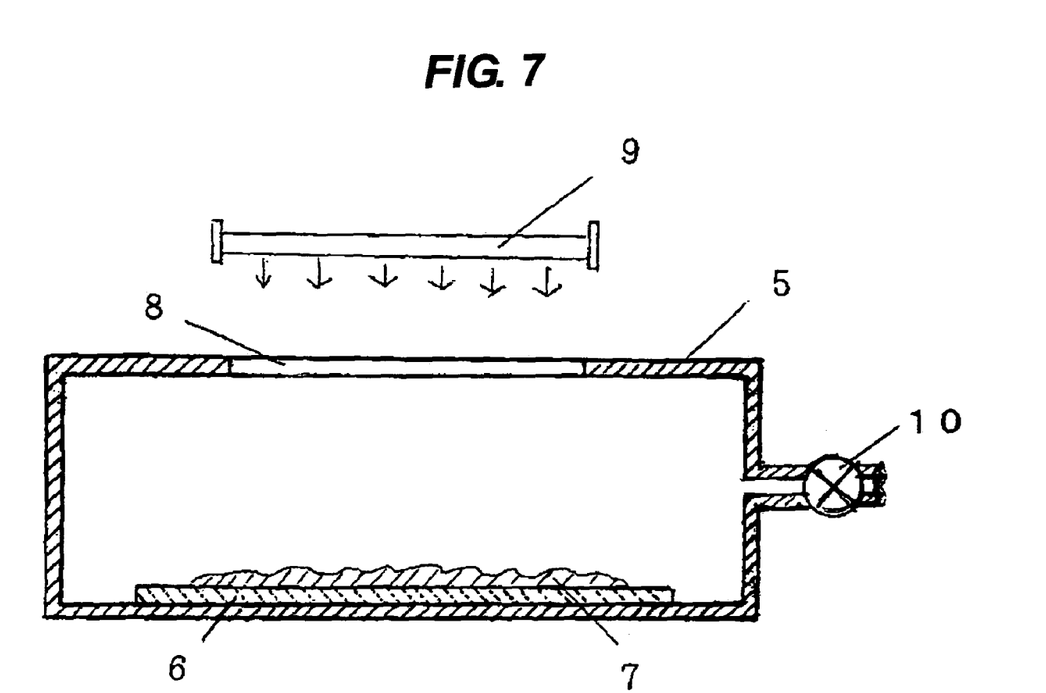
FIG. 7 shows an apparatus to conduct an experiment for conversion of nitrogen oxides to nitric acid with the inventive photocatalysts as in Example 5.

An apparatus shown in FIG. 7 was used to conduct an experiment for conversion of nitrogen oxides to nitric acid with the inventive photocatalysts.

A container 5 in the form of a rectangular parallelepiped (20×100×10 mm) was placed with a glass plate 6 (10×50×2 mm) on the bottom on which 2 g of the photocatalyst particles 7 were put so that they were spread thereon. The container was filled with a mixed gas of nitrogen monoxide and oxygen (with volume ratio of 1:1) under the atmospheric pressure through a valve 10, and irradiation was conducted with a light from a low-pressure mercury lamp or fluorescent lamp 9, or natural light through a quartz window 8 (15×50 mm) for light irradiation followed by conversion of nitrogen monoxide (NO) to nitric acid under the conditions each shown in Table 1 to determine molar production of nitric acid per mol of nitrogen monoxide, on the basis of which the yield of nitric acid was calculated.

The photocatalyst used here was prepared by pulverizing an artificial quartz crystal into particles of 0.5 mm or finer in diameter and immersing the particles in an aqueous solution of hydrogen fluoride in a concentration of 5% by mass for 5 minutes to activate them (Experiment Nos. 1 to 4). Also, a commercial titanium dioxide photocatalyst was used for comparison (Experiment No. 5).

The results are shown in Table 1.

TABLE 1

| Experiment No. | Type of photocatalyst | Amount filled with NO (μmol) | Light source*) | Wavelength range (nm) | Irradiation time (min.) | Light intensity (mW/cm²) | Yield of nitric acid (%) |
|---|---|---|---|---|---|---|---|
| 1 | HF-treated artificial quartz crystal | 3.6 | LPML | >230 | 120 | 0.15 | 13.5 |
| 2 | HF-treated artificial quartz crystal | 3.6 | LPML | >230 | 60 | 0.15 | 4.5 |
| 3 | HF-treated artificial quartz crystal | 3.6 | NL | — | 120 | — | 6.4 |
| 4 | HF-treated artificial quartz crystal | 3.6 | FL | whole range light | 120 | — | 4.8 |

TABLE 1-continued

| Experiment No. | Type of photocatalyst | Amount filled with NO (μmol) | Light source*) | Wavelength range (nm) | Irradiation time (min.) | Light intensity (mW/cm$^2$) | Yield of nitric acid (%) |
|---|---|---|---|---|---|---|---|
| 5 | Commercial TiO$_2$ photocatalyst | 3.6 | LPML | >230 | 120 | 0.15 | 0 |

*)LPML: low-pressure mercury lamp; NL: natural light; FL: fluorescent light

The amount filled with nitrogen monoxide was calculated according to the change of pressure when dry air containing 3.60 μmol of nitrogen monoxide was introduced into the reactor. The light intensity of the light source was measured using a detector exclusively for measured wavelengths of a UV meter (Model "UVR-400", manufactured by Inoue Seieido) under the following conditions.

| Fluorescent lamp (Model "FL6M", a product of Toshiba Corporation) as light source: | 6 W |
|---|---|

$$\text{Decomposition rate (\%)} = \frac{\begin{pmatrix}\text{Concentration of organic} \\ \text{substance in gas} \\ \text{before treatment}\end{pmatrix} - \begin{pmatrix}\text{Concentration of} \\ \text{organic substance} \\ \text{in gas after treatment}\end{pmatrix}}{\begin{pmatrix}\text{Concentration of organic substance} \\ \text{in gas before treatment}\end{pmatrix}} \times 100$$

TABLE 2

| Type of photocatalyst | Type of organic substance | Irradiation conditions | | Concentration of organic substance (μmol) | | Decomposition rate (%) |
|---|---|---|---|---|---|---|
| | | Time (min) | Intensity (mW/cm$^2$) | Before treatment | After treatment | |
| HF-treated artificial quartz crystal | Toluene | 100 | 0.15 | 10.0 | 5.13 | 48.7 |
| | | 150 | 0.15 | 10.0 | 4.65 | 53.5 |
| | Acetaldehyde | 100 | 0.15 | 15.0 | 12.58 | 14.1 |
| | | 150 | 0.15 | 15.0 | 11.22 | 25.3 |
| Photocatalyst of TiO2 | Toluene | 100 | 0.15 | 10.0 | 8.77 | 12.3 |
| | | 150 | 0.15 | 10.0 | 8.18 | 18.2 |
| | Acetaldehyde | 100 | 0.15 | 15.0 | 14.18 | 5.47 |
| | | 150 | 0.15 | 15.0 | 14.85 | 7.67 |

-continued

| Power of visible light: | 736 mW |
|---|---|
| Distance to the sample surface: | 130 mm |

As is apparent from the table, nitrogen oxide which is a pollutant gas in the air can be efficiently converted into nitric acid by using the artificial crystalline quartz particles treated with a hydrogen fluoride as the photocatalyst so as to eliminate the nitrogen oxide.

EXAMPLE 6

A photocatalyst consisting of the same artificial crystalline quartz particles treated with hydrogen fluoride as used in Example 5 was placed in the same apparatus as used in Example 5 in which air after passing through acetaldehyde or toluene was introduced at 15° C. followed by light-exposure using a low-pressure mercury lamp (a special line light source UVL-10; wavelengths of 230 nm or longer; and a light intensity of 0.15 mW/cm$^2$ on the sample surface) as a light source to cause photodecomposition reaction. The time of light-exposure to the sample, the concentrations before and after the treatment and the decomposition rate are shown in Table 2. Incidentally, the case using a commercial TiO$_2$ photocatalyst is shown for comparison.

Incidentally, toluene and acetaldehyde were analyzed by the UV absorption spectroscopy, and the concentration of each compound was calculated according to the relative ratio of absorbances at the characteristic absorption (255 nm for the benzene ring in ethanol, or 290 nm for acetaldehyde in hexane) before and after the treatment.

EXAMPLE 7

A photocatalyst used here consisted of particles obtained by immersing, in an aqueous solution of 10% by mass of hydrogen fluoride, artificial crystalline quartz particles having a particle diameter in the range of 1-2 mm for 5 minutes followed by washing and drying them. In the same manner as in Example 6, the photocatalyst was brought into contact with air containing formaldehyde, methylmercaptan or trichloroethane at 15° C. under exposure to the UV light for 25 minutes to cause photodecomposition reaction.

The concentration of the organic substance before the treatment in the gas phase, and the concentration of the organic substance after the treatment in the gas phase were measured by gas chromatography. The thus obtained results are shown in Table 3.

TABLE 3

| Organic substance | Irradiation conditions | | Concentration of organic substance in gas (μmol) | | Decomposition rate (%) |
| --- | --- | --- | --- | --- | --- |
| | Time (min.) | Intensity (mW/cm$^2$) | Before treatment | After treatment | |
| Formaldehyde | 25 | 0.15 | 10.0 | 3.15 | 68.5 |
| Methylmercaptan | 25 | 0.15 | 10.0 | 4.39 | 56.1 |
| Trichloroethylene | 25 | 0.15 | 10.0 | 6.78 | 32.2 |

It is understood from the results shown in Tables 1 to 3 that the photocatalysts according to the present invention can decompose environmental pollutants at a high efficiency.

INDUSTRIAL APPLICABILITY

According to the present invention, a novel photocatalyst having excellent catalytic activity by using machining waste of artificial quartz crystals, which has been so far discarded without any use, as a base material can be provided and detoxification of various environmental pollutants can be efficiently conducted by using the photocatalyst so as to give an effective tool against environmental pollution with various environmental pollutants.

The invention claimed is:

1. A cleaning method for detoxification of an environmental pollutant which comprises a step of bringing a gas or liquid containing an environmental pollutant into contact, under irradiation of activating light, with a photocatalyst, in an oxidizing condition, wherein:
the photocatalyst comprises particles of a hydrogen fluoride treated artificial quartz crystal;
the particles have a particle diameter of 3.0 mm or less; and
the photocatalyst is obtained by immersing an artificial quartz crystal particle in a solution containing 1-30% by mass of hydrogen fluoride.

2. The cleaning method according to claim 1 wherein the environmental pollutant is a nitrogen oxide and the contacting step is conducted in the presence of water.

3. The cleaning method according to claim 1, wherein the solution contains 5-20% by mass of hydrogen fluoride.

4. The cleaning method according to claim 1, wherein the artificial quartz crystal particle is immersed in the solution for 1-60 minutes at room temperature.

5. The cleaning method according to claim 1, wherein the particles have a particle diameter of 1.0 mm or smaller.

6. The cleaning method according to claim 1, wherein the particles have a particle diameter of 2.0 mm or smaller.

* * * * *